United States Patent [19]
O'Farrell et al.

[11] Patent Number: 5,798,575
[45] Date of Patent: Aug. 25, 1998

[54] VEHICLE MIRROR DIGITAL NETWORK AND DYNAMICALLY INTERACTIVE MIRROR SYSTEM

[75] Inventors: Desmond J. O'Farrell; Roger L. Veldman; Kenneth Schofield, all of Holland, Mich.

[73] Assignee: Donnelly Corporation, Holland, Mich.

[21] Appl. No.: 679,681

[22] Filed: Jul. 11, 1996

[51] Int. Cl.⁶ ............................................. G02B 5/08
[52] U.S. Cl. ........................................ 307/10.1; 701/49
[58] Field of Search ........................... 307/10.1; 701/36, 701/49, 213; 318/466, 446

[56] References Cited

U.S. PATENT DOCUMENTS

| | | |
|---|---|---|
| 4,811,226 | 3/1989 | Shinohara . |
| 4,883,974 | 11/1989 | Tinder ............................. 307/10.1 |
| 5,196,965 | 3/1993 | Lang et al. . |
| 5,424,898 | 6/1995 | Larson et al. . |
| 5,694,259 | 12/1997 | Brandin ........................... 307/10.1 |

FOREIGN PATENT DOCUMENTS

| | | |
|---|---|---|
| 0274848A1 | 7/1988 | European Pat. Off. . |
| 0294791A2 | 12/1988 | European Pat. Off. . |
| 0433531A1 | 6/1991 | European Pat. Off. . |
| 2090017 | 6/1982 | United Kingdom . |
| WO9616838A1 | 6/1996 | WIPO . |

OTHER PUBLICATIONS

Industry Standard SAE J1708 Oct93 entitled "Serial Data Communications Between Microcomputer Systems in Heavy-Duty Vehicle Applications."

Article entitled "Electronics Create the Cybercar," *Design News*, Oct. 10, 1995.

European Search Report from Corresponding European Application No. 9714581.7 dated Sep. 22, 1997.

*Primary Examiner*—Richard T. Elms
*Attorney, Agent, or Firm*—Van Dyke, Gardner, Linn & Burkhart, LLP

[57] ABSTRACT

A vehicle rear vision system includes at least two rearview assemblies each having an image transfer device for transferring images rearwardly of the vehicle in order to be observable by a driver. A rear vision communication system is provided to effect communication between the rearview assemblies. The rear vision communication system also includes a communication link with the vehicle multiplex communication network. The vehicle rear vision system may include an interactive dynamic position control, which repositions each mirror in the system in response to a change in the position of one mirror in a manner which allows the mirror aim to track a driver's eye position.

44 Claims, 6 Drawing Sheets

VEHICLE MIRROR DIGITAL NETWORK AND DYNAMICALLY INTERACTIVE MIRROR SYSTEM

BACKGROUND OF THE INVENTION

This invention relates generally to vehicle rear vision systems for providing drivers with a view rearwardly of the vehicle. The invention may find application with optical rearview mirror assemblies and with solid-state-imaging arrays which capture images rearwardly of the vehicle for display by a display device.

With the advent of electro-optic mirror systems, in which an electro-optic reflectance element is driven to a partial reflectance level by a control module which is responsive to light levels in and around the vehicle, the vehicle rearview mirror has become an electronic assembly. Additional elements, such as motorized positioning devices, or actuators, for the mirror as well as mirror heaters, further contribute to the electrical functions performed by a mirror assembly. These functions require a one-way flow of control information to the mirror assembly. More recent features, such as multiple mirror position memory, require a two-way communication flow. The memory mirror assembly includes a position encoder which communicates the position of the mirror to a memory controller, typically located remotely from the mirror, such as at the vehicle dash. Other two-way communication flows are required by the addition of other features in the rearview mirror, such as keyless entry systems and the like. Other features are being added to vehicle mirrors, in general, and exterior mirrors, in particular, such as remote-actuated exterior vehicle security lights and signal lights, such as disclosed in commonly assigned U.S. Pat. No. 5,371,659 and 5,497,305 for REMOTE ACTUATED EXTERIOR VEHICLE SECURITY LIGHT; global positioning system antennas and/or receivers, as disclosed in commonly assigned United States patent application Ser. No. 08/569,851 filed Dec. 8, 1995, by Roger L. Veldman and Desmond J. O'Farrell for a VEHICLE GLOBAL POSITIONING SYSTEM NAVIGATIONAL AID; and blind spot detection systems, such as disclosed in United States patent application Ser. No. 60/013,941 filed Mar. 22, 1996, by Kenneth (NMI) Schofield for PROXIMITY DETECTION OF OBJECTS IN AND AROUND A VEHICLE, the disclosures of which are hereby incorporated herein by reference. Various other electronic functions, including heading sensors, better known as electronic compasses, intrusion detection and other security systems, antennas for intelligent vehicle highway systems (IVHS), as well as various transmitting and/or receiving antennas and/or systems including garage door openers, cellular telephones, radios, and the like are candidates for positioning within a mirror assembly.

Even with the moderate level of electrification of present vehicle mirror assemblies, it is not uncommon to require as many as 20 wire leads extending to the exterior mirror assemblies. This creates the problem of guiding the wire harness, including a connector, through the door panel. Additionally, the wiring harness adds weight to the vehicle and greatly increases the labor assembly time of the vehicle.

It has been proposed to replace the exterior mirror system of a vehicle with solid-state-imaging arrays which capture images rearwardly of the vehicle for display by a display device on or near the vehicle dash. One such system is disclosed in commonly assigned U.S. Pat. No. 5,670,935 issued to Kenneth (NMI) Schofield, Mark L. Larson and Keith J. Vadas for a REARVIEW VISION SYSTEM FOR VEHICLE INCLUDING PANORAMIC VIEW, the disclosure of which is hereby incorporated herein by reference. In such a rearview vision system, the solid-state-imaging device may be positioned in a housing in the approximate vicinity of present exterior rearview mirrors. As such, it can be expected that many of the electrical functions being placed in the housing of existing and proposed rearview mirror assemblies will be placed in the housing of the solid-state-imaging array in such system.

The increase in electronic functions being performed through the vehicle rearview assembly increasing involves communication with other portions of the vehicle. For example, global positioning system (GPS) functions and intelligent vehicle highway system (IVHS) functions may interact with other modules controlling vehicle navigation and the like. A headlamp control of the type disclosed in commonly assigned U.S. Pat. No. 5,715,093 issued to Kenneth L. Schierbeek and Niall R. Lynam, for an AUTOMATIC REARVIEW MIRROR SYSTEM WITH AUTOMATIC HEADLIGHT ACTIVATION, the disclosure of which is hereby incorporated a partial reflectance level for the electro-optic mirror element. Such feature requires interaction with a headlamp module. Keyless entry systems may interact with the vehicle door locks, as well as interior lighting systems. Blind spot detection, intrusion detection, as well as numerous other functions, may involve interaction with various modules associated with the vehicle dash. Therefore, the vehicle mirror system is becoming more integrated with the rest of the vehicle electronics. A variety of other functions can be integrated into the interior or exterior mirror housing. For example, an electronically trainable garage door opener may be included, such as is described in U.S. Pat. No. 5,479,155 issued to Zeinstra et al.

In order to minimize hardware cost and overhead, as well as provide flexibility for expansion and technological advancements in vehicle electronics, vehicles are increasingly being equipped with serial data communication networks. Such networks include a bidirectional serial multiplex communication link over a bus among a plurality of control modules, each containing a microprocessor or microcomputer. Messages are transmitted asynchronously with priorities assigned to particular messages. For example, messages which require immediate access to the bus for safety reasons are provided top priority, with messages that require prompt action in order to prevent severe mechanical damage to the vehicle provided with a lesser priority but a higher priority than messages that affect the economical or efficient operation of the vehicle. The protocol of the system provides that higher priority messages are communicated without delay while lower priority messages await communication of higher priority messages. An industry standard for such serial data communication network is SAEJ1708 published October, 1993.

Functions associated with rearview mirror assemblies have traditionally not been included on the vehicle communication network. Almost all of the traditional mirror functions would be assigned lowest priority and would, therefore, have to await transmission of higher priority messages. Therefore, the traditional approach has been to provide dedicated hardware interconnects between devices located in the rearview mirror assemblies and external devices, such as power sources, switches, controls, and the like. One solution is proposed in U.S. Pat. No. 5,196,965 entitled REARVIEW UNIT FOR MOTOR VEHICLES in which a multiplex data system communicates information between a control unit and at least one exterior rearview mirror. While such system reduces the wire count extending through the door, or doors, to the exterior mirrors, it fails to fully integrate functions associated with the mirror assemblies with the remaining electronic assemblies of the vehicle.

Vehicle memory mirror systems include encoders for monitoring the position of each mirror element with respect to typically two axes and a positioning device, such as an actuator, for selectively positioning the mirror element with respect to those axes. A control unit, typically located in and about the dash or in the door assembly, is capable of storing multiple data sets, each of which establishes a particular position of one or more of the vehicle's mirror elements. In this manner, when a different driver operates the vehicle, the data set associated with the driver is retrieved and utilized to position the mirror element, or elements, according to that data set. In order to do so, it is necessary to have information regarding the actual position of the mirror, which is provided by the position encoder, in order to enable the control to properly position the mirror element or elements. Such memory mirror systems further contribute to the wiring problem associated with rearview mirrors. The signals from the position encoder require additional wire leads, and all mirror assemblies included in the system must be wired back to a processor which is typically located in the dash. Furthermore, a user input device, such as a joystick, must be provided for use with each of the mirror elements of the memory mirror system in order to allow each driver to adjust each mirror element and store the position of that mirror element for that driver. This is a rather cumbersome process that can be distractive if performed while the vehicle is being operated.

SUMMARY OF THE INVENTION

The present invention is directed to a vehicle rear vision system having at least two rearview assemblies. Each of the rearview assemblies includes an image transfer device for transferring images rearwardly of the vehicle in order to be observable by a vehicle driver and a housing for the image transfer device. According to an aspect of the invention, a rear vision communication system provides communication between the rearview assemblies. Additionally, the rear vision communication system includes a communication link with the vehicle communication network. The rear vision communication system preferably includes control modules in each of the rearview assemblies which are interconnected by a communication channel. The image transfer device may be a mirror element, preferably an electro-optic mirror element and, most preferably, an electrochromic mirror element. Alternatively, the mirror element could be a chrome mirror or a standard silvered day/night prismatic mirror, especially for the interior rearview assembly. Alternatively, the image transfer device may be a solid-state-imaging array which captures images rearwardly of the vehicle for display by a display device.

According to a somewhat more specific aspect of the invention, a vehicle rear vision system includes an interior rearview mirror assembly and at least one exterior rearview mirror assembly, each including an electro-optic reflectance element and a housing for the reflectance element. The interior rearview mirror assembly includes a microprocessor-based control having a control channel to establish a partial reflectance level of the associated electro-optic reflectance element. The exterior rearview mirror assembly includes a microprocessor-based control having a first control channel to establish a partial reflectance level of the associated electro-optic reflectance element, a second control channel to selectively activate a heater element in heat transfer association with the associated electro-optic reflectance element, a third control channel to operate a positioning device for the associated electro-optic reflection element, and a fourth control channel for receiving positional data from an encoder coupled with the associated electro-optic reflectance element. A communication channel is provided interconnecting the microprocessor-based controls, defining a rear vision communication network. At least one of the microprocessor-based controls includes a hardware node configured to interconnect with the vehicle communication network. That particular microprocessor-based control is programmed to format messages for the vehicle communication network and decode messages from the vehicle communication network.

Such a vehicle rear vision system, including a rear vision communication network, enhances the functionality of the vehicle rear vision system because the control commands for strictly local functions associated with the rear vision system are handled without requiring access to the vehicle communication network. In this manner, the rear vision system functions do not need to compete with higher priority functions of the vehicle communication network, such as automatic braking systems, air bag systems, and the like. This additionally reduces the load on the vehicle communication network by reducing the number of messages processed on that network. A vehicle rear vision system, according to the invention, provides connectivity between functions carried out by the vehicle rear vision system and other portions of the vehicle electronic system. This is provided by the communication link between the rear vision communication network and the vehicle communication network. This is accomplished without requiring a link between each rearview assembly control module and the vehicle communication network. Not only does this enhance the functionality of the vehicle rear vision system and the vehicle communication network, it reduces system hardware and software expense because most rearview assemblies require only a communication module and associated software. Only one of the rearview assemblies must be fully compatible with the vehicle communication network. A vehicle rear vision system, according to the invention, also significantly reduces the number of wire runs to each rearview assembly which reduces weight and cost while concurrently facilitating enhancement in reliability.

A vehicle rear vision system, according to yet an additional aspect of the invention, includes a plurality of rearview mirror assemblies, each including a reflective element, an actuator, which adjustably positions the reflective element about at least one axis, and a position encoder, which monitors the position of the reflective element with respect to that axis. A control is provided which is responsive to the encoder for each mirror assembly in order to supply positioning signals to the actuator for that mirror assembly. The positioning signals are a function of the position of the reflective element of that mirror assembly. The positioning signals are additionally a function of the position of the reflective element of at least one other of the mirror assemblies. Because each mirror reflective element is positioned by its actuator as a function not only of its own position, but the position of one or more of the other mirror reflective elements, a change in position of one reflective element results in a repositioning of all of the reflective elements controlled in this manner. This interactive dynamic memory mirror system is capable of defining a unique position, associated with the driver's eyes, which is targeted by all mirrors as a viewing point. As the viewing point changes, the position of the mirrors change in unison. Thus, this aspect of the invention provides an active closed-loop system which correlates the position of all mirror reflective elements. The user viewing point may be established by a conventional user input device, such as a joystick, such that manipulation of the joystick allows the user to simultaneously reposition all of the system mirror elements. This reduces the amount of manipulation which must be carried out by the driver to position the mirrors according to the viewing point of that driver. Additionally, a reduction in system hardware may be effected because only one joystick circuit is required. This aspect of the invention also comprehends the elimination of the joystick altogether by allowing the driver to position one mirror reflective element, such as the interior mirror reflective element, by hand with the control interactively repositioning the other mirror elements in response to the manual repositioning of the mirror reflective element. Alternatively, the location of the driver's eyes and, therefore, the optimum viewing point for each of the mirror elements, may be measured by machine vision techniques using solid-state-imaging arrays and image recognition software known in the art.

A dynamic interactive memory mirror system, according to this aspect of the invention, may additionally include a "zeroing" function in order to allow the driver to establish an initial positional relationship of the mirror elements that is more suitable to that driver. This would be particularly advantageous for drivers who utilize unconventional seating postures. The positional relationships of the mirror elements may be fixed to a more desirable viewing angle with respect to the vehicle than is typically utilized by most drivers. For example, it is known that most drivers align exterior rearview mirrors in order to capture at least a portion of the side of the vehicle in the image viewed in the mirror element by the driver. However, a mirror element orientation which extends angularly more outwardly of the vehicle may be more optimal for capturing objects in the driver's traditional blind spot. By pre-establishing positional relationships between the mirror elements, it may be possible to position the exterior mirrors in more appropriate positions with respect to the position of the interior mirror than that which would be typically set by the driver utilizing conventional norms. These and other objects, advantages, and features of this invention will become apparent upon review of the following specification in conjunction with the drawings.

DESCRIPTION OF THE PREFERRED EMBODIMENT

Figure 1:
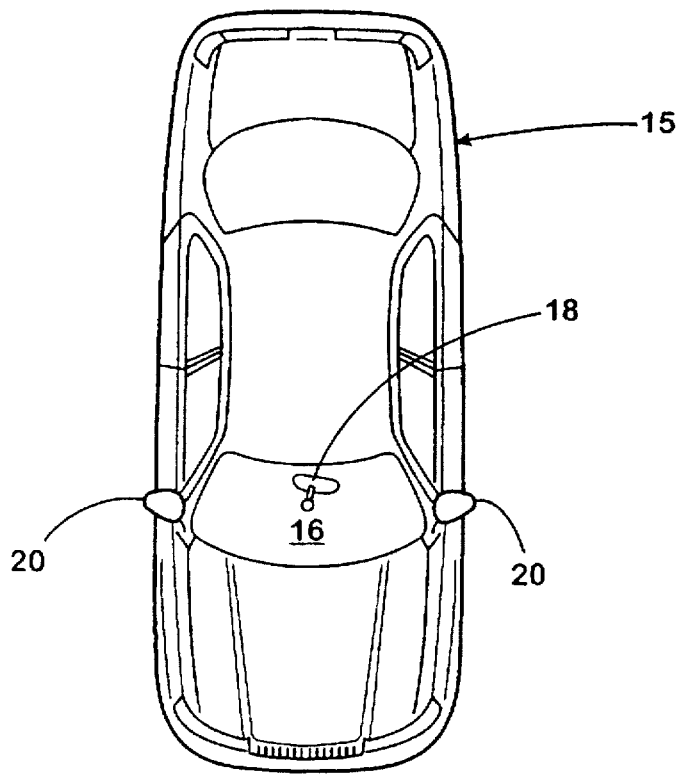
FIG. 1 is a top plan view of a vehicle incorporating the invention.

Referring now specifically to the drawings, and the illustrative embodiments depicted therein, a vehicle 15 is shown having a vehicle rear vision system 16, including an interior rearview assembly 18 and a pair of exterior rearview assemblies 20 (FIG. 1). In the illustrated embodiment, interior rearview assembly 18 is an interior rearview mirror which is preferably an electrically operated optical device and, most preferably, an electro-optic mirror, such as an electrochromic mirror, a liquid crystal mirror, or the like. Exterior rearview assemblies 20 may be exterior rearview mirror assemblies which are preferably electrically operated optical devices and, most preferably, electro-optic mirrors, such as an electrochromic mirror or a liquid crystal mirror, or the like, of the type disclosed in U.S. Pat. No. 5,371,659 entitled REMOTE ACTUATED EXTERIOR VEHICLE SECURITY LIGHT, the disclosure of which is hereby incorporated herein by reference. Alternatively, exterior rearview assemblies 20 and, possibly, interior rearview assembly 18 may be image transfer devices incorporating a solid-state-imaging array which captures images rearwardly of the vehicle for display by a display device (not shown), as disclosed in commonly assigned U.S. Pat. No. 5,670,935 issued to Kenneth (NMI) Schofield, Mark L. Larson, and Keith J. Vadas for a REARVIEW VISION SYSTEM FOR VEHICLE INCLUDING PANORAMIC VIEW, the disclosure of which is hereby incorporated herein by reference.

Figure 2:
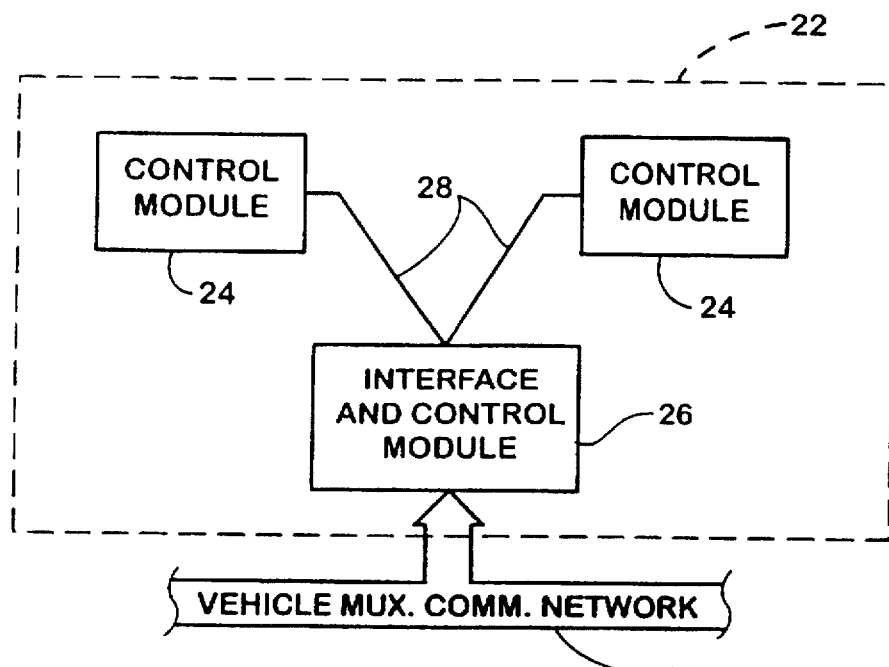
FIG. 2 is a block diagram of a rear vision communication system, according to the invention.

Vehicle rear vision system 16 includes a rear vision communication system 22 having one or more control modules 24, each of which is associated with interior rearview assembly 18 or an exterior rearview assembly 20 (FIG. 2). Rear vision communication system 22 further includes an interface and control module 26, which may be associated with interior rearview assembly 18, or an exterior rearview assembly 20, and which is interconnected with control modules 24 by a communication channel illustrated at 28. In addition to being linked with control module(s) 24, interface and control module 26 is linked with a vehicle-multiplexed communication network 30 provided with vehicle 15. Such vehicle-multiplexed communication network is typically proprietary to the manufacturer of the vehicle but is supplied according to industry standards, such as SAEJ1708 dated October, 1993, entitled SERIAL DATA COMMUNICATION BETWEEN MICROCOMPUTER SYSTEMS IN HEAVYDUTY VEHICLE APPLICATIONS, the disclosure of which is hereby incorporated herein by reference.

Figure 6:
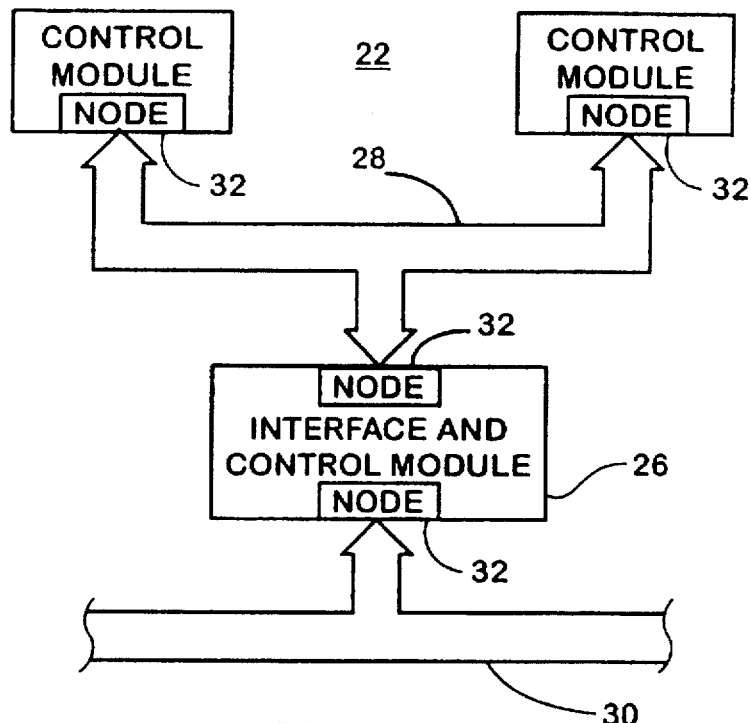
FIG. 6 is an alternative embodiment of a rear vision communication system.

In one embodiment, communication channel 28 of rear vision communication system 22 is a bidirectional, multiplex serial communication link, as illustrated in FIG. 6, that is supplied according to industry standards for serial data communications, such as SAEJ1708 issued October, 1993. As such, communication channel 28 preferably is defined by a pair of conductors including a redundant pair of conductors. Each control module 24 and interface and control module 26 includes a serial bus data node 32. Communication channel 28 is interfaced in hardware with each control module 24 and interface and control module 26 through the associated data node 32. Interface and control module 26 includes an additional node serial bus 32 for linking with the vehicle-multiplexed communication network 30. Nodes 32 are hardware-defined receiver or transceiver circuits complying with RS-485 protocol as defined in SAEJ1708 or other suitable communication protocol.

Alternatively, communication channel 28' could be defined by a fiber-optic cable having either a glass or plastic fiber with nodes which are capable of interfacing such fiber-optic system with control modules 24 and interface and control module 26. Alternatively, communication channel 28' could be a radio frequency (RF) link; in which case, the nodes would be capable of interfacing the RF link with control modules 24 and interface and control module 26. Alternatively, communication channel 28 may be defined by superimposing communication signals on the vehicle DC power grid, a technique generally referred to as carrier-current modulation, as well as other known techniques for transmitting data.

Figure 7:
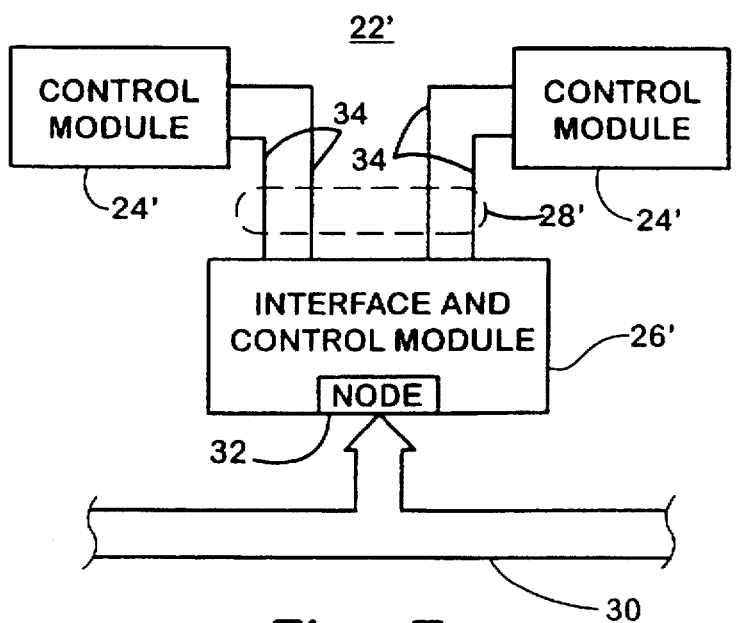
FIG. 7 is another alternative embodiment of a rear vision communication system.

An alternative rear vision communication system 22' is illustrated in FIG. 7. System 22' utilizes a communication channel 28' defined by a plurality of separate leads 34 providing interconnections between interface and control module 26' and each control module 24' without requiring a serial bus data node, although such node could be used to improve transmission over longer distances. Communication channel 28' could be a non-multiplexed system in which interface and control module 26' regulates communication with each control module 24'. As such, communication from one control module 24' to the other control module 24' would take place under the control of interface and control module 26'. However, interface and control module 26' includes a serial bus data node 32 linking the rear vision communication system 22' with vehicle-multiplexed communication network 30.

Rear vision communication system 22 can communicate between modules in the rear vision system according to any protocol that is suited to the application, as would be readily apparent to those skilled in the art. Preferably, rear vision communication system 22 would comply with industry standards, such as SAE J1708 (OCT93), which is the typical standard utilized for vehicle-multiplexed communication network 30. Because it is a separate and distinct communication system, rear vision communication system 22 can utilize its own message definition and priority which can be consistent irrespective of the proprietary protocol utilized with the vehicle-multiplexed communication network to which the rear vision communication system is linked. In this manner, only the software of the interface and control module 26 must be adapted to the particular proprietary protocol of the vehicle. The remaining hardware and software of rear vision communication system 22 would be uniform irrespective of the particular vehicle. Rear vision communication system 22 may use other network configurations such as the Novell 10-Base-T hub-and-spoke architecture, or the like.

Figure 3:
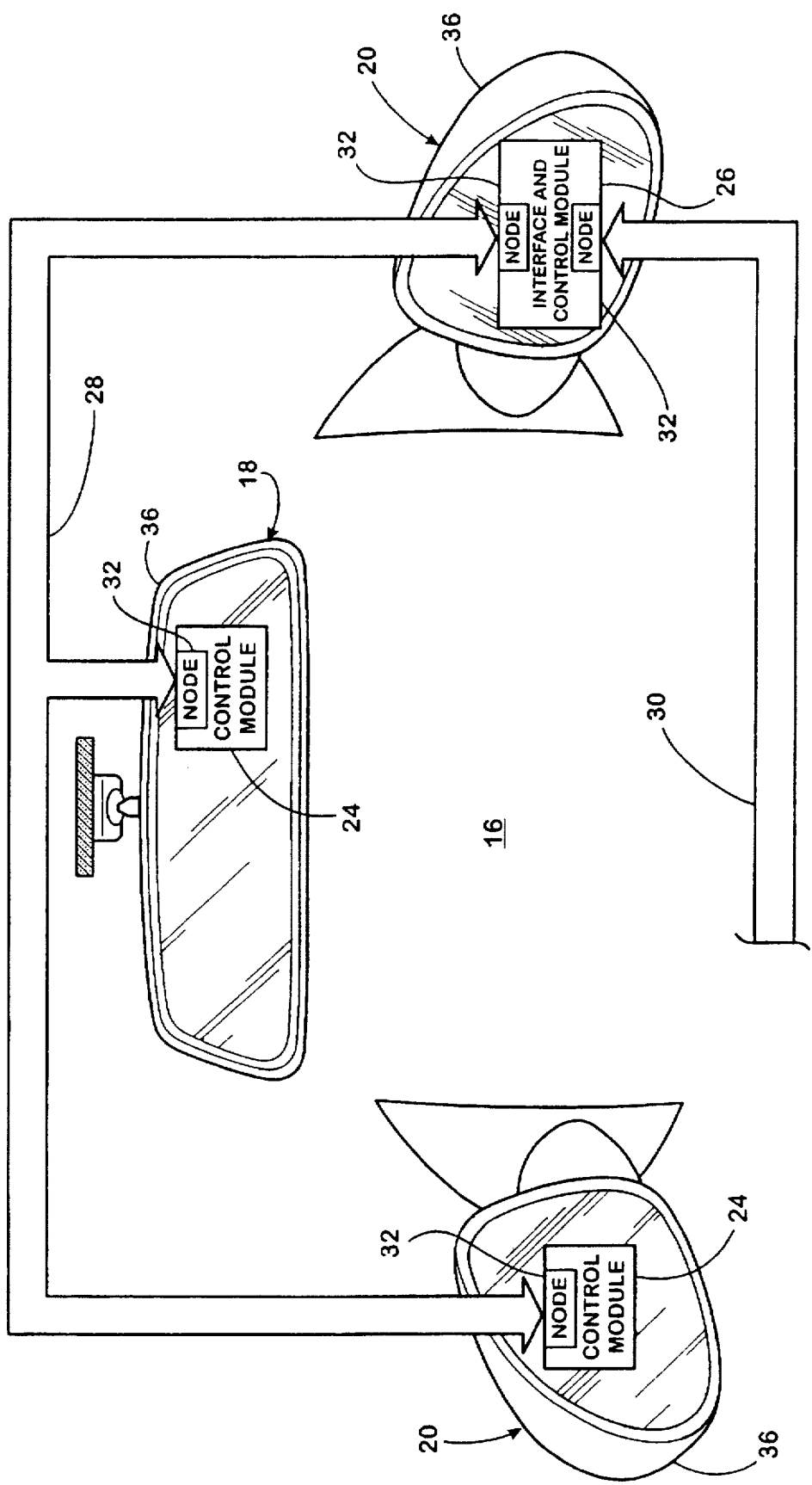
FIG. 3 is a first embodiment of a vehicle rear vision system incorporating the invention.
Figure 4:
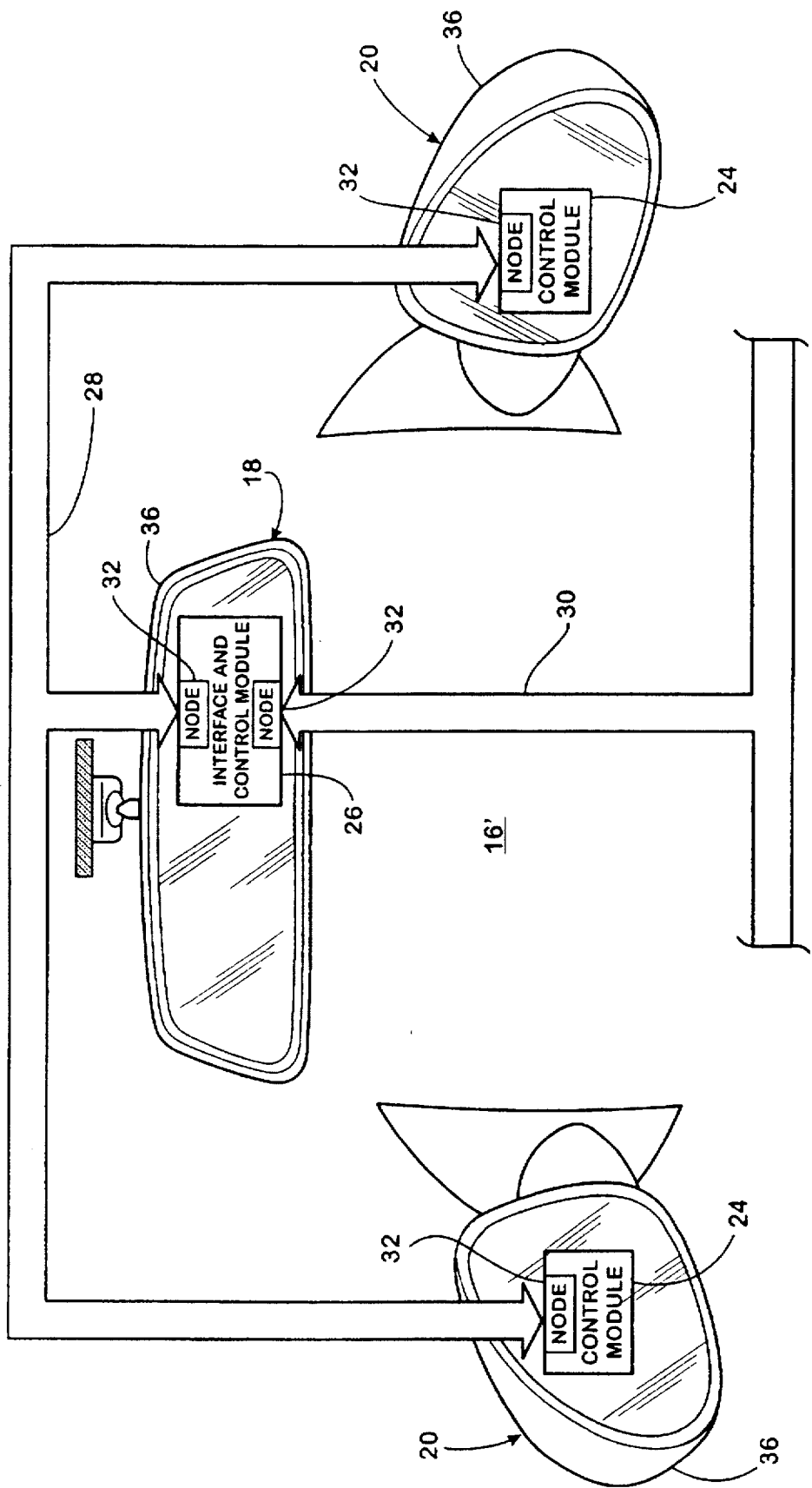
FIG. 4 is an alternative embodiment of a vehicle rear vision system.

As can be seen in FIGS. 3 and 4, each control module 24 or interface and control module 26 is positioned within interior rearview assembly 18 or one of exterior rearview assemblies 20. In particular, the respective control module or interface and control module is positioned within a housing 36 of the respective rearview assembly. In the embodiment illustrated in FIG. 3, vehicle vision system 16 incorporates interface and control module 26 in an exterior rearview assembly 20. In this manner, the link with vehicle-multiplexed communication network 30 is made at the corresponding exterior rearview assembly 20. In an alternative embodiment illustrated in FIG. 4, vehicle rear vision 16' incorporates interface and control module 26 within the housing 36 of interior rearview assembly 18. In this manner, the link with vehicle-multiplexed communication network 30 is made at the interior rearview assembly for vehicle rear vision system 16'.

Figure 5:
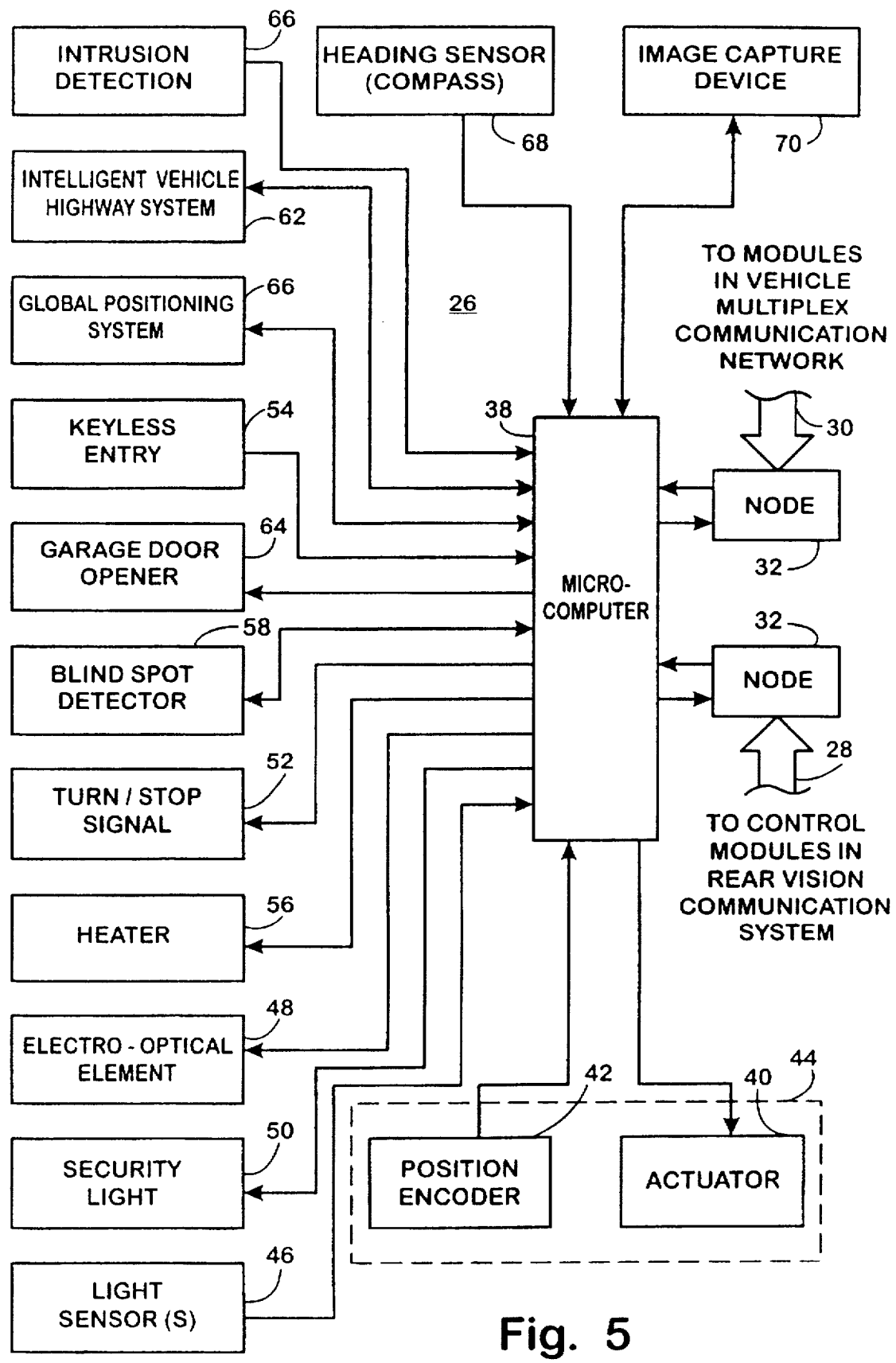
FIG. 5 is a block diagram of a control module.

A representative interface and control module 26 is illustrated in FIG. 5. Interface and control module 26 includes a microcomputer 38 and a pair of serial bus data nodes 32. One node 32 is connected with communication channel 28, and the other is connected with vehicle-multiplexed communication network 30. Microcomputer 38 is interconnected with one or more input and/or output devices, as illustrated in FIG. 5. It should be understood that the particular input and/or output devices interconnected with microcomputer 38 may vary depending upon the particular features provided with vehicle 15 and the location of interface and control module 26. If interface and control module 26 is positioned within interior rearview assembly 18, the input and/or output devices would likely be different than if interface and control module 26 is positioned within the housing of exterior rearview assembly 20. It should additionally be understood that a control module 24 is similar to interface and control module 26, except that serial bus data node 32 extending to the vehicle-multiplexed communication network would not be provided for the control module.

By reference to FIG. 5, interface and control module 26 may provide an output to an actuator 40 and receive an input from a position encoder 42, both of which are mechanically coupled with a mirror reflectance element, generally illustrated at 44. In this manner, microcomputer 38 provides outputs to operate actuator 40 and receives positional data from encoder 42 as an input. Interface and control module 26 may additionally receive an input from one or more light sensors 46. The level of light to which light sensors 46 are exposed may be utilized by microcomputer 38 in order to provide an output to an electro-optic element 48 in order to establish the partial reflectance level of the electro-optic element and/or may be utilized to provide an output over vehicle-multiplexed communication bus 30 to a headlight control module (not shown) in order to activate the vehicle headlights in low light conditions and deactivate the vehicle headlights in high light conditions, both functions are disclosed in commonly assigned U.S. Pat. No. 5,715,093 issued to Kenneth L. Schierbeek and Niall R. Lynam for an AUTOMATIC REARVIEW MIRROR SYSTEM WITH AUTOMATIC HEADLIGHT ACTIVATION, the disclosure of which is hereby incorporated herein by reference.

Microcomputer 38 may additionally provide an output in order to actuate a security light 50 and/or a turn and/or stop signal 52 of the type disclosed in commonly assigned U.S. Pat. No. 5,371,659 entitled REMOTE ACTUATED EXTERIOR VEHICLE SECURITY LIGHT, the disclosure of which is hereby incorporated herein by reference. The signal to actuate security light 50 may be received as an input from a keyless entry antenna 54. Instead of merely a keyless entry antenna, device 54 may be an entire keyless entry receiver system including antenna and receiver. Microcomputer 38 may additionally provide an output to a heater 56 which is in heat transfer association with reflective element 44. Heater 56 may be of the type disclosed in commonly assigned U.S. Pat. No. 5,446,576 for an ELECTROCHROMIC MIRROR FOR VEHICLE WITH ILLUMINATION CONTROL, the disclosure of which is hereby incorporated herein by reference.

The previously described functions performed by microcomputer 38 involve primarily mirror-related functions or one-way communications provided from an input device or to an output device. As can be seen, for example, with respect to control of the activation state of the vehicle headlights, the input provided to microcomputer 38 may be communicated over the vehicle-multiplexed communication bus 30 to other modules on the vehicle bus. Likewise, communication with other modules on the vehicle bus may be two-way communication. For example, a blind spot detector 58 may provide inputs to, and receive outputs from, microcomputer 38 which are then communicated through vehicle communication bus 30 to other vehicle control modules. Interface and control module 26 may additionally include a global positioning system (GPS) antenna 60, or entire GPS receiver assembly including the receiver electronics associated with the antenna, which provides an input to, and receives an output from, microcomputer 38 as disclosed in commonly assigned International Application WO97/21127 published Dec. 6, 1996 by Roger L. Veldman and Desmond J. O'Farrell for a VEHICLE GLOBAL POSITIONING SYSTEM NAVIGATIONAL AID, the disclosure of which is hereby incorporated herein by reference. In a similar fashion, interface and control module 26 may include two-way communication with an intelligent vehicle highway system (IVHS) transceiver 62 in order to receive IVHS input data, and to transmit IVHS output data, as is known in the art. Interface and control module 26 may include an output to a garage door opener antenna 64, or system including transmitter electronic components. Interface and control module 26 may include an intrusion detection module 66 and a compass sensor module 68 of the type disclosed in commonly assigned U.S. Pat. No. 5,255,442 entitled VEHICLE COMPASS WITH ELECTRONIC SENSOR, the disclosure of which is hereby incorporated herein by reference.

Interface and control module 26 may be used in combination with a solid-state image capture device 70 of the type disclosed in the PCT International Publication No. WO96/38319 published 5 Dec. 1996, by Kenneth (NMI) Schofield, Mark L. Larson, and Keith J. Vadas for a REARVIEW VISION SYSTEM FOR VEHICLE INCLUDING PANORAMIC VIEW, the disclosure of which is hereby incorporated herein by reference. Microcomputer 38 may process image data captured by image capture device 70 providing a direct communication channel (not shown) to a display device located in and around the vehicle dash. Alternatively, microcomputer 38 may provide data over vehicle-multiplexed communication bus 30 or rear vision assembly communication channel 28 indicative of changes in particular image pixel data, as disclosed in the aforementioned patent application, in order to reduce the amount of data transmission to the display device.

Figure 8:
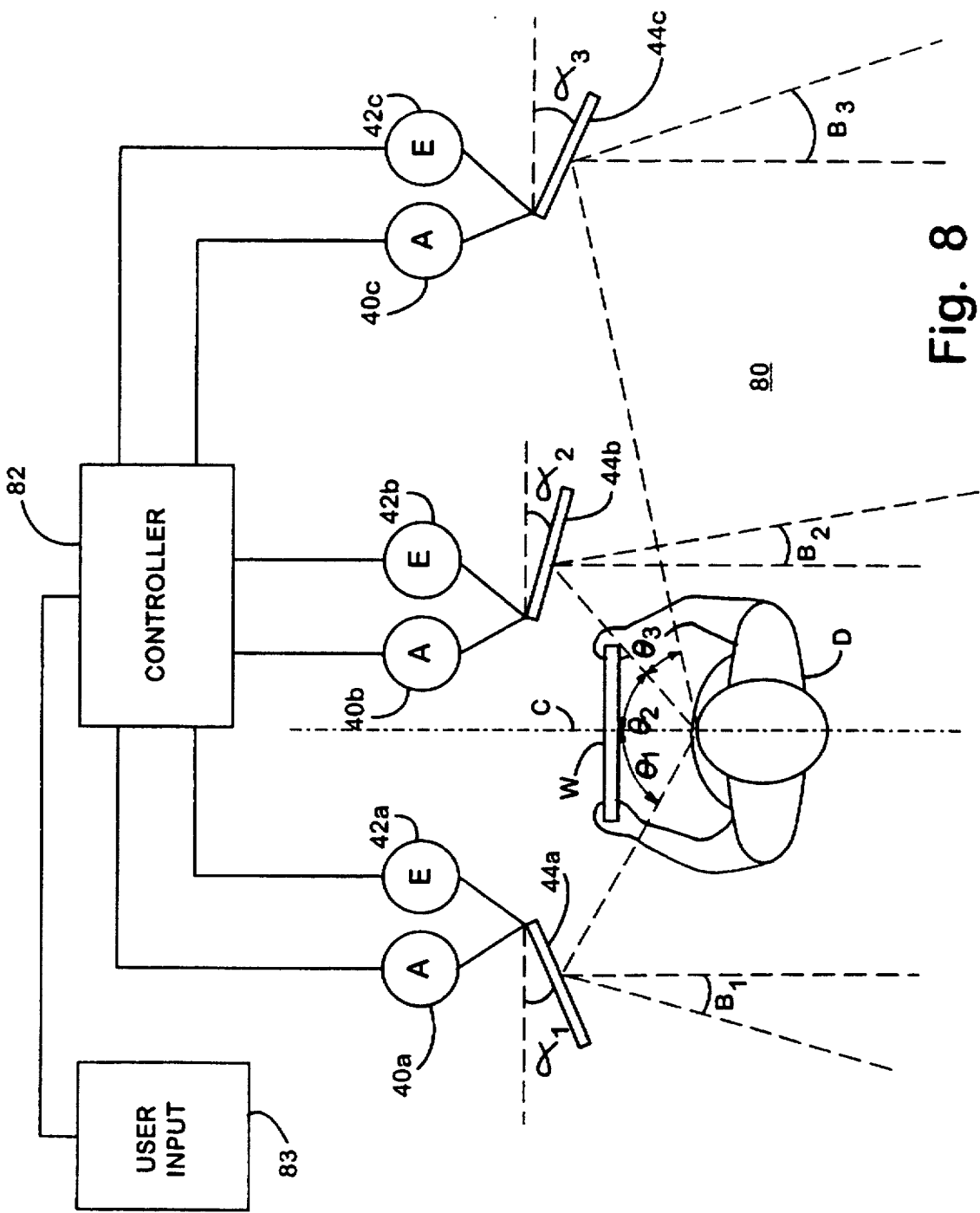
FIG. 8 is a top plan view of an interactive mirror system, according to the invention.

An interactive, dynamically adjustable mirror system 80 is provided, in which actuator 40a and position encoders 42a and 42c for reflective elements 44a and 44c of driver-side exterior rearview assembly and passenger-side rearview assembly 20 are provided to a controller 82 (FIG. 8). A position actuator 40b and encoder 42b may additionally be provided with the reflective element 44b of the interior rearview assembly 18 and interconnected with controller 82 (FIG. 8). If it is assumed that the driver's eyes are laterally centered on an axis C extending through the center of the steering wheel W, an angle $\theta_1$ is formed between the eyes of the driver and the driver-side mirror element 44a, an angle $\theta_2$ is formed between the driver's eyes and the interior reflective element 44b, and an angle $\theta_3$ is formed between the driver's eyes and the passenger-side exterior reflective element 44c. Assuming that angle $\beta_1$ between the vehicle's longitudinal axis and the field of view observed through the driver-side exterior reflective element is to remain constant, a change in angle $\theta_1$ requires a corresponding change in angle $\alpha_1$, which is the orientation of the driver-side exterior reflective element 44a with respect to a vertical axis. Likewise, a change in angle $\theta_2$ will require a change in the angle $\alpha_2$ of interior reflective element 44b in order to maintain field of view angle $\beta_2$ constant, and a change in angle $\theta_3$ will require a change in the angle of the reflective element 44c of the passenger-side exterior mirror in order to maintain the corresponding field of view $\beta_3$ constant. Utilizing known geometric relationships, a change in any one of the angles $\theta_1$, $\theta_2$, or $\theta_3$ would provide sufficient information to determine corresponding changes in the value of the other of the angles $\theta_1$, $\theta_2$, and $\theta_3$. Likewise, utilizing known geometric relationships, corresponding changes in angles $\alpha_1$, $\alpha_2$, and $\alpha_3$ required to compensate for changes in angles $\theta_1$, $\theta_2$, and $\theta_3$ while keeping the fields of view $\beta_1$, $\beta_2$, and $\beta_3$ constant can be determined. Accordingly, if a change is made in any one of the positional angles $\alpha_1$, $\alpha_2$, and $\alpha_3$, then the necessary changes to the other of the angles $\alpha_1$, $\alpha_2$, and $\alpha_3$ required to re-establish the desired field of view angles $\beta_1$, $\beta_2$, and $\beta_3$, can be determined. In a similar manner, the positional location of reflective elements 44a–44c about a horizontal axis may be geometrically related to the vertical location of the driver's eyes such that a change, for example, from one driver to another, or a change in the driver's seat elevation, would provide known interrelationships between the relative positions of the reflective elements with respect to a horizontal axis. This principle is utilized in order to provide an interactive closed-loop system which correlates the position of all mirror reflective elements 44a–44c and establishes a particular positional relationship between the mirrors. By providing a user input 83 for the driver to adjust the position of one reflective element 44a–44c, interactive mirror system 80 readjusts the positions of the other reflective elements 44a–44c, preferably about both vertical and horizontal axes, or other pairs of axes, in order to compensate for changes in the driver's viewing point.

Changes in the position of the driver's eyes can be determined in various ways. One manner would be to provide a joystick for user input selection device 83 to allow the driver to manually adjust the position of one of the reflective elements. Controller 82 would respond to the change in position of one of the reflective elements 44a–44c by providing suitable adjustments in the other reflective elements 44a–44c. Another manner would be to allow the driver to manually position one of the mirror elements, such as the reflective element associated with the interior mirror, while monitoring movement of that mirror through its associated position encoder 42. The resulting change in the position of the manually adjustable mirror would be processed by controller 82 in order to provide commensurate changes in the position of the exterior mirror reflective elements. Another technique for determining changes in the driver's eye location would be to utilize a machine vision system in order to capture the image of the driver's eyes and determine changes in such position. Such systems are known in the art.

Interactive mirror system 80 may additionally include a zero reset function in order to allow the driver to adjust the relative position of any of the reflective elements for a given eye position. The system may further include a lockout feature in order to allow the operator to lock out the interactive function in order to allow a normal memory function to occur, as is known in the art. The system may additionally provide an override feature to allow the mirror elements in the system to be independently adjusted.

An interactive mirror system, according to the invention, provides a unique set of mirror positions for each driver that allows the optimum field of view to be provided for that driver to thereby minimize blind spots and provide the driver with the optimal information on trailing vehicles or when backing the vehicle. In this manner, an interactive mirror system, according to the invention, not only reduces the amount of distraction to the driver for repositioning the mirrors, but also improves the performance of the mirror system by overcoming preconceived notions of drivers as to an optimum position of the mirrors.

Advantageously, an interactive mirror system 80 may utilize a rear vision communication system 22 in order to effectively and efficiently communicate control functions among the interior rearview assembly 18 and the two exterior rearview assemblies 20.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A vehicle rear vision system for a vehicle having a vehicle communication network, comprising:
    at least two rearview assemblies, each including an image transfer device for transferring images rearwardly of the vehicle in order to be observable by a vehicle driver and a housing for the image transfer device; and
    a rear vision communication system providing communication between said rearview assemblies and including a communication link defined by a node interconnected with the vehicle communication network;
    wherein communication with other portions of the vehicle is provided while control commands for functions associated with said at least two rearview assemblies are handled without requiring access to the vehicle communication network.

2. A vehicle rear vision system for a vehicle having a vehicle communication network, comprising:
    at least two rearview assemblies, each including an image transfer device for transferring images rearwardly of the vehicle in order to be observable by a vehicle driver and a housing for the image transfer device; and
    a rear vision communication system including control modules in said rearview assemblies interconnected by a communication channel defining a rear vision communication network, at least one of said control modules effecting communication between said control modules and the vehicle communication network;
    wherein said rear vision communication network has a particular message definition and protocol which are different from those of the vehicle communication network.

3. The rear vision system in claim 2 wherein said image transfer device is a mirror.

4. The rear vision system in claim 3 wherein said control modules include control channels which communicate with at least one of an electro-optic element, a mirror heater, a mirror-positioning device, a light-sensing device and a mirror position encoder.

5. The rear vision system in claim 3 wherein at least one of said control modules includes control channels which communicate with an electro-optic element, a mirror heater, a mirror-positioning device and a mirror position encoder.

6. The rear vision system in claim 3 wherein said at least one of said control modules is associated with a vehicle interior mirror.

7. The rear vision system in claim 3 wherein said at least one of said control modules is associated with a vehicle exterior mirror.

8. The rear vision system in claim 2 wherein at least one of said control modules includes control channels which activate at least one of a security light positioned in the associated housing and a signal device positioned in the associated housing.

9. The rear vision system in claim 8 wherein said signal device is a turn signal.

10. The rear vision system in claim 2 wherein at least one of said control modules includes control channels which communicate with at least one of an electromagnetic antenna and a blind spot detector.

11. The rear vision system in claim 10 wherein said antenna is one of a global positioning system antenna, an intelligent vehicle highway system antenna, cellular telephone antenna, a keyless entry antenna, a garage door opener antenna, a radio antenna and a radar antenna.

12. The rear vision system in claim 2 wherein said image transfer device is a solid-state-imaging array which captures images rearwardly of the vehicle for display by a display device.

13. The rear vision system in claim 2 wherein said at least one of said control modules translates protocol between the protocol of the vehicle communication network and the protocol of the rear vision communication network.

14. The rear vision system in claim 2 wherein said communication channel is a bidirectional, serial communication link and each of said control modules includes a microprocessor and at least one serial bus data node interfacing said microprocessor to said communication channel.

15. The rear vision system in claim 14 wherein said at least one of said control modules includes a serial bus data node interfacing the associated microprocessor to the vehicle communication network.

16. The rear vision system in claim 2 wherein said at least one of said control modules includes a serial bus data node interfacing to the vehicle communication network.

17. The rear vision system in claim 2 wherein said communication channel includes one of an electrical conductor, a fiber-optic path, a radio frequency link and a carrier-current modulation system.

18. A vehicle rear vision system for a vehicle having a vehicle communication network, comprising:
    an interior rearview mirror assembly and at least one exterior rearview mirror assembly, each including an electro-optic reflective element and a housing for the reflective element;
    said interior rearview mirror assembly including a microprocessor-based control having a control channel to establish a partial reflectance level of the associated electro-optic reflective element;
    said at least one exterior rearview mirror assembly including a microprocessor-based control having a first control channel to establish a partial reflectance level of the associated electro-optic reflective element, a second control channel to selectively activate a heater element in heat transfer association with the associated electro-optic reflective element, a third control channel to operate a positioning device for the associated electro-optic reflective element and a fourth control channel for receiving positional data from an encoder coupled with the associated electro-optic reflective element; and
    a communication channel interconnecting said microprocessor-based controls defining a rear vision communication network;
    wherein one of said microprocessor-based controls includes a hardware node configured to interconnect with the vehicle communication network and is programmed to format messages for the vehicle communication network and decode messages from the vehicle communication network.

19. The rear vision system in claim 18 wherein said at least one exterior rearview mirror assembly includes two exterior rearview mirror assemblies, each including a microprocessor-based control having a first control channel to establish a partial reflectance level of the associated electro-optic reflective element, a second control channel to selectively activate a heater element in heat transfer association with the associated electro-optic reflective element, a third control channel to operate a positioning device for the associated electro-optic reflective element and a fourth control channel for receiving positional data from an encoder coupled with the associated electro-optic reflective element; wherein said communication channel interconnects said microprocessor-based controls of said interior rearview mirror assembly and said two exterior rearview mirror assemblies.

20. The rear vision system in claim 18 wherein said one of said microprocessor-based controls translates protocol between the protocol of the vehicle communication network and the protocol of the rear vision communication network.

21. The rear vision system in claim 18 wherein said one of said microprocessor-based controls is associated with said vehicle interior rearview mirror assembly.

22. The rear vision system in claim 18 wherein said one of said microprocessor-based controls is associated with said at least one vehicle exterior rearview mirror assembly.

23. The rear vision system in claim 18 wherein said communication channel is a bidirectional, serial communication link and each of said microprocessor-based controls includes at least one serial bus data node interfacing said microprocessor to said communication channel.

24. A vehicle interactive dynamically adjustable mirror system, comprising:
 a first mirror assembly having a first reflective element and a first actuator which positions said first reflective element to a first position;
 a second mirror assembly having a second reflective element and a second actuator which positions said second reflective element to a second position;
 said first reflective element establishing a first field of view of said first reflective element that is driver selectable by user actuation of said first actuator to reposition said first reflective element; and
 a control which is responsive to the position of said first reflective element to operate said second actuator to reposition said second reflective element establishing a second field of view in response to repositioning said first reflective element;
 wherein driver adjustment of said first reflective element to said first field of view causes said second reflective element to reposition to said second field of view in order that the driver is provided with satisfactory rearward vision from said first and second reflective elements for safe operation of the vehicle.

25. The mirror system in claim 24 including a user adjustable input device in order to supply signals to the actuator for the reflective element of said other of said mirror assemblies to adjust the position of the reflective element of that other of said mirror assemblies.

26. The mirror system in claim 25 wherein said input device is a user manipulable joystick.

27. The mirror system in claim 25 wherein said input device is a user manipulable switching device.

28. The mirror system in claim 25 wherein said input device is an encoder mechanically coupled with a manually positionable reflective element.

29. The mirror system in claim 24 including a lockout device to lock out said control.

30. The mirror system in claim 24 including a zero-set device to set a zero position for the associated reflective element of that mirror assembly.

31. The mirror system in claim 24 wherein said first mirror assembly includes a first position sensor which senses the position of said first reflective element and wherein said control monitors said first position sensor in order to determine the position of said first reflective element.

32. The mirror system in claim 31 wherein said second mirror assembly includes a second position sensor which senses the position of said second reflective element and wherein said control monitors said second position sensor in order to position said second reflective element.

33. The mirror system in claim 24 wherein said first and second mirror assemblies are vehicle exterior rearview mirror assemblies.

34. The mirror system in claim 24 wherein said first mirror assembly is a vehicle exterior rearview mirror assembly and said second mirror assembly is a vehicle interior rearview mirror assembly.

35. The mirror system in claim 24 wherein said first mirror assembly is a vehicle interior rearview mirror assembly and said second mirror assembly is a vehicle exterior rearview mirror assembly.

36. The mirror system in claim 24 including a third mirror assembly having a third reflective element and a third actuator which positions said third reflective element to a third position, wherein said control is responsive to the position of said first reflective element to operate said third actuator to reposition said third reflective element establishing a third field of view in response to repositioning said first reflective element, wherein driver adjustment of said first reflective element to said first field of view causes said third reflective element to reposition to said third field of view in order that the driver is provided satisfactory rearward vision from said first, second and third reflective elements for safe operation of the vehicle.

37. The mirror system in claim 36 wherein said third mirror assembly is a vehicle interior rearview mirror assembly.

38. The mirror system in claim 36 wherein said third mirror assembly is an exterior rearview mirror assembly and one of said first and second mirror assemblies is an interior rearview mirror assembly.

39. A vehicle interactive dynamically adjustable mirror system, comprising:
 a first mirror assembly having a first reflective element and a first position sensor which senses the position of said first reflective element;
 a second mirror assembly having a second reflective element and an actuator which positions said second reflective element to a second position;
 said first reflective element establishing a first field of view of said first reflective element that is driver selectable by manually grasping a portion of said first mirror assembly; and
 a control which is responsive to said first position sensor to operate said second actuator to reposition said second reflective element establishing a second field of view in response to repositioning said first reflective element;
 wherein driver adjustment of said first reflective element to said first field of view causes said second reflective element to reposition to said second field of view in order that the driver is provided with satisfactory rearward vision from said first and second reflective elements for safe operation of the vehicle.

40. The mirror system in claim 39 wherein said second mirror assembly includes a second position sensor which senses the position of said second reflective element and wherein said control monitors said second position sensor in order to position said second reflective element.

41. The mirror system in claim 39 wherein said first mirror assembly is a vehicle interior rearview mirror assembly and said second mirror assembly is a vehicle exterior rearview mirror assembly.

42. The mirror system in claim 39 including a third mirror assembly having a third reflective element and a third actuator which positions said third reflective element to a third position, wherein said control is responsive to said position sensor positioned to operate said third actuator to reposition said third reflective element establishing a third field of view in response to repositioning said first reflective element, wherein driver adjustment of said first reflective element to said first field of view causes said third reflective element to reposition to said third field of view in order that the driver is provided satisfactory rearward vision from said first, second and third reflective elements for safe operation of the vehicle.

43. The mirror system in claim 42 wherein said third mirror assembly is a vehicle exterior rearview mirror assembly.

44. The mirror system in claim 43 wherein one of said first and second reflective elements is a vehicle interior rearview mirror assembly.

* * * * *

UNITED STATES PATENT AND TRADEMARK OFFICE
CERTIFICATE OF CORRECTION

PATENT NO. : 5,798,575
DATED : August 25, 1998
INVENTOR(S) : Desmond J. O'Farrell, Roger L. Veldman and Kenneth Schofield It is certified that error appears in the above-identified patent and that said Letters Patent is hereby corrected as shown below:

Column 2, line 20:
    After "incorporated" insert --herein by reference, utilizes common light sensors for activating the vehicle's headlights and establishing--.

Signed and Sealed this

Fifteenth Day of August, 2000

Attest:

Q. TODD DICKINSON

*Attesting Officer*          *Director of Patents and Trademarks*